(12) United States Patent
Sridhar et al.

(10) Patent No.: US 12,368,632 B2
(45) Date of Patent: Jul. 22, 2025

(54) SYSTEM AND METHOD FOR ROOT CAUSE ANALYSIS IN A COMPUTER NETWORK

(71) Applicant: Sandvine Corporation, Waterloo (CA)

(72) Inventors: Kamakshi Sridhar, Plano, TX (US); Seshu Dommaraju, Allen, TX (US); Lyndon Wayne Cantor, Prosper, TX (US); Kris Kobernat, Allen, TX (US); Alexander Havang, Malmo (SE); Ambuj Mittal, Bengaluru (IN)

(*) Notice: Subject to any disclaimer, the term of this patent is extended or adjusted under 35 U.S.C. 154(b) by 120 days.

(21) Appl. No.: 18/478,043

(22) Filed: Sep. 29, 2023

(65) Prior Publication Data
US 2024/0113933 A1    Apr. 4, 2024

Related U.S. Application Data

(60) Provisional application No. 63/413,796, filed on Oct. 6, 2022, provisional application No. 63/411,728, filed on Sep. 30, 2022.

(30) Foreign Application Priority Data

Sep. 28, 2023 (EP) .................................. 23200675

(51) Int. Cl.
*H04L 41/0631* (2022.01)
*H04L 41/5009* (2022.01)
(Continued)

(52) U.S. Cl.
CPC ........ *H04L 41/0631* (2013.01); *H04L 43/026* (2013.01)

(58) Field of Classification Search
CPC ............... H04L 41/0631; H04L 43/026; H04L 41/5009; H04L 41/5067; H04L 43/55
(Continued)

(56) References Cited

U.S. PATENT DOCUMENTS

2012/0208562 A1* 8/2012 Wilkin .................. H04L 43/091
                                                             455/456.3
2013/0044597 A1* 2/2013 Rugel ................. H04L 65/1083
                                                             370/230.1
(Continued)

FOREIGN PATENT DOCUMENTS

EP     2530870 B1    9/2015
EP     3700134 A1    8/2020
(Continued)

OTHER PUBLICATIONS

Partial European Search Report, European Patent Office, on corresponding EP Application No. 23200675.9 dated Feb. 23, 2024.

*Primary Examiner* — Jude Jean Gilles
(74) *Attorney, Agent, or Firm* — Amarok IP Inc.; Neil W. Henderson

(57) ABSTRACT

A method and system for root cause analysis in a computer network. The method includes: determining a degradation of QoE for at least one traffic flow of at least one user; determining a traffic pattern associated with the degradation of the QoE; determining a root cause for the degradation based on the traffic pattern; and implementing a traffic action response based on the root cause. The system includes: a QoE module configured to determine a degradation of QoE for at least one traffic flow of at least one user; a detection module configured to determine a traffic pattern associated with the degradation of the QoE; a issue determination module configured to determine a root cause for the degradation based on the traffic pattern; and a traffic action module configured to implement a traffic action response based on the root cause.

16 Claims, 14 Drawing Sheets

(51) Int. Cl.
*H04L 43/026* (2022.01)
*H04L 43/55* (2022.01)

(58) Field of Classification Search
USPC .......................................................... 709/224
See application file for complete search history.

(56) References Cited

U.S. PATENT DOCUMENTS

| | | | |
|---|---|---|---|
| 2013/0067109 A1* | 3/2013 | Dong | H04L 43/08 |
| | | | 709/231 |
| 2013/0143561 A1* | 6/2013 | Nuss | H04W 24/02 |
| | | | 455/436 |
| 2016/0065419 A1* | 3/2016 | Szilagyi | G06F 11/3409 |
| | | | 709/224 |
| 2017/0373950 A1* | 12/2017 | Szilagyi | H04L 43/08 |
| 2018/0013776 A1* | 1/2018 | Gay | G06N 20/00 |
| 2019/0149396 A1 | 5/2019 | Zafer et al. | |
| 2019/0222491 A1 | 7/2019 | Tomkins et al. | |
| 2020/0112491 A1* | 4/2020 | Sridhar | H04L 43/026 |

FOREIGN PATENT DOCUMENTS

| | | |
|---|---|---|
| WO | 2017143139 A1 | 8/2017 |
| WO | 2021089113 A1 | 5/2021 |

* cited by examiner

| Top Level Assessment | High Level Action | Detection Level 1 | Diagnosis Level 2 | Diagnosis Level 3 | Next Best Action |
|---|---|---|---|---|---|
| Frequency per diagnosis level | | | as-needed | as-needed | |
| Outage (absence of anticipated traffic) | Corrective action needed | Path outage (outage) | Identify location(s) & estimate subscribers impacted by outage | Access point (shaping cell) | Escalate to appropriate team with location and estimated number of subscribers impacted |
| | | | | Network infrastructure | |
| | | | | Other | |
| Achieves QoE > 3 | No action | N/A | N/A | N/A | None |
| Achieves subscriber target but poor QoE < 3 | Potential upsell or design / strategy review | Shaped / Managed at subscriber level (managed subscriber) | Anomalous subscriber shaping (sub level shaping doesn't meet plan) Policy Shaping | N/A | Check shaping config |
| | | | Heavy User Management (HUM) | Self congestion (multiple app) | Upsell plan or recommend single app at a time |
| | | | | Subscriber limit (single app) | Upsell plan |
| | | | Video Stream Management (VSM) | Self congestion (multiple app) | Upsell plan or recommend single app at a time |
| | | | | Subscriber limit (single app) | Upsell plan |
| | | Unmanaged | Identify plan(s) where target is achieved | Self congestion (multiple apps) | Upsell plan or recommend single app at a time |
| | | Lower plan / achieves plan / plan limit | | Subscriber limit (single app) | Upsell plan |
| | | | | Self congestion (multiple apps) | Note as churn risk & revenue opp'ty; implement traffic management |
| | | | | Subscriber limit (single app) | Include additional diagnosis factors |
| Misses subscriber target and poor QoE < 3 | Corrective action needed | internal path congestion (network congestion) | Identify congested location(s) | Mass event | Check for neighbor outages |
| | | | | Heavy user(s) | Implement HUM |
| | | | | Video | Forward to capacity planning; implement VSM |
| | | | | Other | Forward to capacity planning; implement FVCM, IBCM, VSM, TCP |
| | | internal path issue (impacts many subs) (network fault) | Identify location(s) | Vendor specific | Open trouble-ticket with vendor |
| | | | Sfow issue | Other | |
| | | | Other | N/A | |
| | | Application specific issue (impacts many subs) (external) | Application server issue (by IP address) | N/A | Notification on auto-assistant / IVR system |
| | | | CDN issue | N/A | |
| | | | DNS issue | N/A | |
| | | | BGP route issue | N/A | |
| | | | Other | N/A | |
| | | Device static issue (H/W+SW version) (device) | Software + Hardware combination | N/A | |
| | | | Manufacturer | N/A | |
| | | | Hardware | N/A | |
| | | | Software | N/A | |
| | | Wifi RF Issue (CPE placement) (Wifi placement) | N/A | N/A | Explain device location dependency; upsell Wifi extender |
| | | Other (undiagnosed) | N/A | N/A | |

FIG. 5

SYSTEM AND METHOD FOR ROOT CAUSE ANALYSIS IN A COMPUTER NETWORK

RELATED APPLICATIONS

The present disclosure claims priority from U.S. Provisional Application No. 63/411,728 filed Sep. 30, 2022, and U.S. Provisional Application No. 63/413,796 filed Oct. 6, 2022, and European Patent Application No. 23200675.9 filed Sep. 28, 2023, all of which are hereby incorporated herein in their entirety.

FIELD

The present disclosure relates generally to computer network traffic. More particularly, the present disclosure relates to a system and method for root cause analysis in a computer network.

BACKGROUND

Service Providers, including Internet Service Providers (ISP) as well as content providers, generally try to provide the best Quality of Service (QoS) to the largest number of users given network constraints. As more people access content via online networks and as users increase the amount of data used, congestion continues to grow. As such, various congestion control strategies have been used to attempt to improve the Quality of Service (QoS) and the Quality of Experience (QoE) for users on the network.

An operator is concerned about users having a high QoE and QoS while using the network. As such, it is important for an operator to understand and diagnose any issues on the network or with the subscriber's interaction with the network from end-to end. In some cases, it may be difficult to determine a cause of an issue, be it a congested link, a down server, a User Equipment failure, or the like. In order to mitigate and resolve issues, there is a requirement to understand the issue and the cause of the issue.

Conventional techniques rely on Round Trip Time (RTT) and throughput, but these techniques are not aware of application QoE. Therefore, if throughput is low these conventional solutions cannot distinguish if the application is facing poor QoE, or if the application did not require the throughput at a higher level.

Operators traditionally deploy different types of probes designed to analyze the messaging in a control plane or try to monitor performance using the network elements themselves. The probes are generally configured to provide operators with information about possible issues in the network. However, even if the probes indicate that the network is working fine, subscribers may be experiencing poor QoE. Poor QoE can be attributed to a variety of issues or causes. Further, operators want to know if there are issues in the network, or issues with mobile users or application servers. Operators desire to have as complete as possible a picture of the actions on the network.

As such, there is a need for an improved method and system for root cause analysis on a computer network. There is a need for a method and system able to proactively take action based on a trigger or root cause issue in the network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for root cause analysis in a computer network, the method including: determining a degradation of Quality of Experience (QoE) for at least one traffic flow of at least one user on the computer network; determining a traffic pattern associated with the degradation of the QoE; determining a root cause for the degradation based on the traffic pattern; and implementing a traffic action response based on the root cause of the degradation.

In some cases, the method may further include: monitoring the at least one traffic flow to determine whether the QoE is improving; and if the QoE is not improving, implementing a next best traffic action to address the root cause.

In some cases, the method may further include: if the QoE is not improving determining whether the root cause was a false positive or false negative assessment; determining further data associated with the degradation of QoE to determine a new root cause; and implementing a further traffic action response to address the new root cause.

In some cases, determining the degradation of QoE may include: determining whether the degradation of QoE is an intended response to the at least one user; and if the degradation is the intended response, then providing a traffic action response of suggesting an upgrade in network plan to the at least one user.

In some cases, determining the traffic pattern associated with the degradation of the QoE may include: reviewing the traffic flow of the at least one user; and determining a sequence of events of the traffic flow to create the traffic pattern.

In some cases, determining the root cause of the degradation based on the traffic flow may include: determining a top level assessment of the degradation; determining whether the degradation was an intended response; and reviewing further diagnostic levels of the traffic pattern to determine the root cause.

In some cases, implementing at least one traffic action may include preparing a visual representation of the degradation of QoE and the at least one subscriber affected.

In some cases, the visual representation may provide details as to the root cause of the degradation of QoE and potential further traffic actions to address the degradation.

In some cases, implementing at least one traffic action may include implementing at least one congestion management traffic action.

In another aspect, there is provided a system for root cause analysis in a computer network, the system including: a QoE module configured to determine a degradation of Quality of Experience (QoE) for at least one traffic flow of at least one user on the computer network; a detection module configured to determine a traffic pattern associated with the degradation of the QoE; a issue determination module configured to determine a root cause for the degradation based on the traffic pattern; and a traffic action module configured to implement a traffic action response based on the root cause of the degradation.

In some cases, the system may further include a monitoring module configured to monitor the at least one traffic flow to determine whether the QoE is improving; and if the QoE is not improving, the traffic action module is configured to implement a next best traffic action to address the root cause.

In some cases, the system may further include: if the QoE is not improving, the monitoring module is configured to determine whether the root cause was a false positive or false negative assessment; the detection module is further configured to determine further data associated with the degradation of QoE to determine a new root cause; and the traffic action module is further configured to implement a further traffic action response to address the new root cause.

In some cases, the detection module may be further configured to determine whether the degradation of QoE is an intended response to the at least one user; and if the degradation is the intended response, then the traffic action module is configured to provide the traffic action response of suggesting an upgrade in network plan to the at least one user.

In some cases, the detection module may be further configured to: review the traffic flow of the at least one user to determine the traffic pattern associated with the degradation of the QoE; and determine a sequence of events of the traffic flow to create the traffic pattern.

In some cases, the issue determination module may be configured to: determine a top level assessment of the degradation; determine whether the degradation was an intended response; and review further diagnostic levels of the traffic pattern to determine the root cause.

In some cases, the traffic action module may be configured to provide a visual representation of the degradation of QoE and the at least one subscriber affected.

In some cases, the visual representation may provide details as to the root cause of the degradation of QoE and potential further traffic actions to address the degradation.

In some cases, the traffic action module may be configured to provide at least one traffic action comprises implementing at least one congestion management traffic action.

In yet another aspect, there is provided a method for congestion management in a computer network, the method includes: determining an application Quality of Experience (QoE) for at least one application for at least one user on the computer network; determining whether the application QoE is not meeting a predetermined intent; determining who, what, where and when the application is not meeting the intent; and implementing a congestion management response based on the determined responses to the who, what, where and when.

In some cases, the congestion management response may include at least one of: TCP acceleration, load balancing, blocking, or traffic steering.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 5 is a table illustrating various levels of assessment and detection by the system and method according to an embodiment;

DETAILED DESCRIPTION

Figure 1:
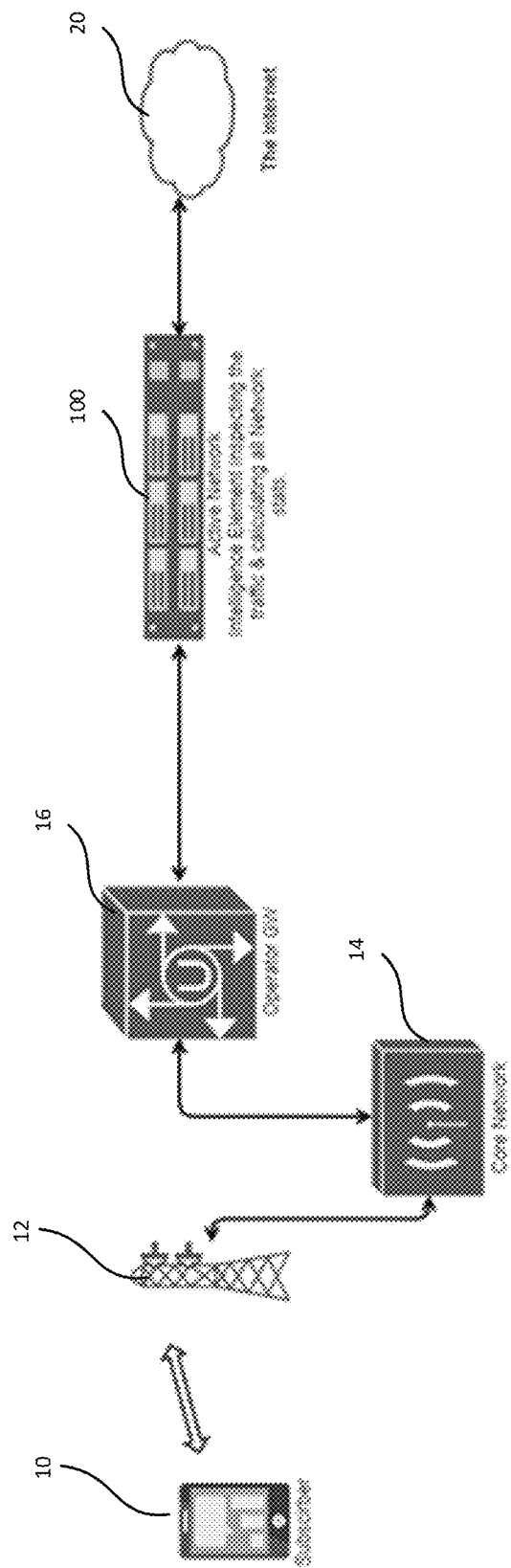
FIG. 1 illustrates a diagram of a computer network architecture including an embodiment of a system for root cause analysis.

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for root cause analysis. The system is configured to determine a change or degradation in Quality of Experience (QoE) either overall QoE or QoE for a specific subscriber or application. The method and system are intended to network data to determine data associated with the change in QoE to determine whether there is an issue to be addressed. In some cases, a top level assessment will be completed to determine whether there is an issue or if the change in QoE is expected or explainable. If the top level assessment determines there is an issue or further determination is required, the system may review further data and traffic patterns and/or traffic signatures to determine the cause of the change in QoE. Embodiments of the system and method are intended to use traffic signatures and sequencing of decisions and determinations to determine a root cause of an issue and to suggest or apply appropriate traffic actions to address the situation. In some cases, the system may further monitor the traffic after a traffic action has been made to determine whether the QoE has improved, and the issue has been resolved.

The sequencing and timing of the traffic flow may provide insight into the traffic pattern and specific traffic signature. In some cases, the order of the traffic occurrences may provide for insight into the assessment. As a specific example, it will be noted that in a case where a subscriber is streaming media, there will be different traffic patterns for a media that is paused over a media that has stalled or has lost signal. In particular, both scenarios will reduce the traffic to the subscriber, but if the media is paused, there will not be the packet loss seen if the media has stalled or experienced an outage. As such, reviewing the traffic patterns, the order or sequence of the changes to the traffic is intended to provide further detail into the potential issue.

In some cases, embodiments of the system and method may measure a degradation of Application QoE (AQoE). In these cases, the system may determine whether a plurality of subscribers is experiencing similar degradation and whether there is a network congestion issue. In some cases, the system may determine that a congestion management traffic action be implemented to address the degradation of AQoE.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by the operator network 16 and may be reviewed and classified by a system 100 for root cause analysis. The system 100 may be included as a component of a network device which resides between the operator's gateway and the Internet 20. The system 100 is intended to reside within the operator's or Internet Service Provider's (ISP's) network 16. It will be understood that embodiments of the system and method detailed herein are intended to be employed over any type of computer network, for example, fixed line, mobile, satellite or other computer network.

The system 100 is configured to be transparent to the users. It will be understood that FIG. 1 illustrates a high-level network architecture and that a computer network may include further aspects not illustrated.

A system 100 for root cause analysis is intended to reside in the core network. In particular, the system 100 is intended to be in a location where the system is able to access the data noted herein. It will be understood that in some cases, the system may be a physical network device or may be a virtual networking device. It will be understood that the system may be used on any IP based networking system, for example, Wi-Fi based, mobile data networks like, 4G, 5G, LTE, satellite based, WLAN based networks, fixed line broadband fiber optic networks as well as on virtual private networks.

The system and method detailed herein provide a methodology for root cause analysis. In some cases, the system is configured to make use of specific questions, traffic signatures and a sequencing of these aspects which are associated with an issue or problem to identify the root cause. The system is intended, by using this analysis, to determine the unexpected behavior that may be resulting in poor QoE or poor Application QoE.

Subscribers 10 or Users of an operator's network expect high Quality of Experience (QoE) for their applications. Application QoE (AQoE) is a real time indicator of the user experience for an application. Application QoE provides insight into the network behavior and the impact of the behavior on the subscriber.

Degradation in AQoE for a given application can be a leading indicator of network impairment, such as a link failure, server or cache failure, congestion on links and/or nodes, unexpected traffic events, malicious subscriber or network security attack, or other issue. Further, Degradation in AQoE can be used to raise appropriate Key Performance Indicator (KPI) or Key Quality Indicator (KQI) based alarms that raises alerts to the operator when there is network impairment or anomalous behavior. As examples, the operator may want to have an alarm when widely used applications like DNS, Netflix, Google, or the like suffer from a services score below a predefined threshold for a majority or a certain percentage of the subscriber base. In other cases, overall QoE can indicate when a particular location generally scores poorly for applications, when a type of end user device or Customer Premises Equipment (CPE) has a sudden drop in scoring, or another action that indicates immediate issues that the operator should take action on is determined by the system an alarm can be raised. Left unattended these alarms may continue to be raised, accompanied by consistently poor subscriber AQoE, till the root cause is identified and appropriate actions are taken. The process of diagnosing the issue causing the AQoE degradation is often referred to as root cause analysis.

Recommendation of an appropriate set of targeted and timely actions is very helpful for a user, such as an operations persona, at a network operator. Presentation of a clear set of actions driven by the traffic network data can lead to responses that restore the network to its full operating capabilities or provide the subscriber with an increased QoE or AQoE. All this is accomplished without the Operations persona/user having to mine through data themselves. Further, there are some corrective actions or targeted actions that may be completed automatically, for example, congestion control, rerouting to avoid a node, or the like that may address the AQoE or QoE degradation without the requirement of manual intervention.

Monitoring degradation in user AQoE or QoE through various levels of assessments and diagnostics is intended to permit an effective root cause analysis. Some examples of questions to be addressed are:

i. What is being impacted?
ii. Who is being impacted?
iii. When is it happening?
iv. Where in the network is it happening?
v. Why is it happening?

Embodiments of the system and method are intended to provide for a root cause identification by monitoring the AQoE and its subcomponents such as, Throughput, Latency, Loss, Jitter and the like and deriving various statistics, for example, mean, median, min and max, for one or more subscribers. These measurements or statistics are intended to be used to diagnose the issue causing the degradation (root cause analysis), and thus lead to a responsive and effective action. These statistics could be aggregated in various manners, for example, per subscriber, per location, or the like, depending on the analysis and the subscribers' experiencing issues.

In some cases, by asking or determining responses to a series of questions or scenarios such as the above, the system and method may triangulate the issue and determine the root cause of the issue in a sequence of steps. Identifying the root cause of an issue via the system and method is intended to include the examination of available AQoE data from the perspectives of time, space, scope, impact and the like.

A simple example decision tree would be, trying to get the root cause analysis for a poor Netflix AQoE score for Subscriber John's iPhone 11. First the system may determine whether all AQoE for All subscribers deteriorated or bad? Root Cause Analysis could be determined as a general network issue across the country. If not all the subscribers, then determine whether all subscribers have poor Netflix scoring? The system may then determine if there is an issue with Netflix servers or Netflix connectivity in the core. If not, the system may further determine whether all subscribers with iPhone 11 are having issues with poor Netflix scores? The system may determine that there is an issue with iPhone 11 firmware or settings. Further, if the subscribers in John's current location are having issues with Netflix? The system can determine that there is a location specific connectivity issues for Netflix. If not, the system may seek to answer whether John is having issues with non-Netflix applications as well. It may be determined that John is having connectivity issues or some issue on his specific device or, if not, John's Netflix application on his iPhone is performing poorly, most likely not related to the network at all. Further examples are detailed herein.

Figure 2:
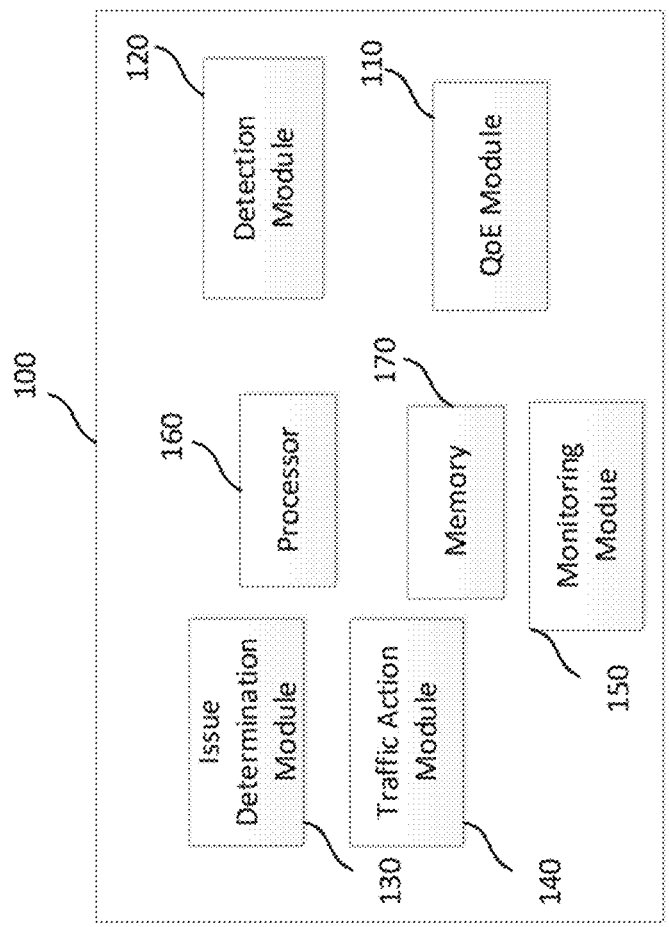
FIG. 2 illustrates a system for root cause analysis according to an embodiment.

FIG. 2 illustrates a system for root cause analysis. The system is intended to include a QoE module 110, a detection module 120, an Issue Determination module 130, a traffic action module 140, a monitoring module 150, at least one processor 160 and at least one memory component 170. The system is generally intended to be distributed and reside in the data plane. A central processing unit or the control processor may be configured to execute the instructions stored in the memory component in order for the modules to execute their functions.

The system for root cause analysis 100 is intended to tap network traffic at a control point. Tapping the traffic in the network is intended to provide the system with data from the endpoints of the traffic flow. As such, the system is able to review traffic patterns for the complete traffic flow. The system is configured to determine the links and routes the traffic takes in order to determine outages and/or other degradations at various levels of the traffic flow.

The QoE module 110 is configured to monitor the QoE and the application QoE of the subscribers and/or users using the operator's network. The QoE module 110 is configured to determine a score for the QoE for the subscribers and the applications. QoE Scores are intended to be determined with an understanding of what each application requires for different levels of subjective QoE (similar to Mean Opinion Score (MOS) scoring for voice) in terms of Throughput, Latency, Loss and Jitter, and high frequency time-series data on what each application achieves for a subscriber with metrics for Throughput, Latency, Loss and Jitter. The QoE module 110 is configured to determine if there is an anomaly in the QoE or application QoE of a user or if there is a degradation or downward trend in the application QoE score that may indicate an issue with the user's experience of the network. In some cases, the system may analyze a QoE or an application QoE score below a predetermined threshold. In a particular example, if the score is out of 5, any score equal to or under a 3 may be reviewed. In other cases, the monitoring may be continuous or may be at predetermined intervals. Any analysis may occur after a downward trend is seen, or if a plurality of measurements is below a predetermined threshold.

The detection module 120 is configured to determine associated assessments and scenarios associated with the data the QoE module 110 has flagged or noted an issue with a subscriber's QoE. The detection module may use a decision tree to determine the data associated with the issue and may review the operator's network to determine what is being affected, who is being affected, when is the effect being noticed and where is it being noticed. From the review of these types of assessments and scenarios, as detailed herein the detection module 120 is configured to determine various aspects about the flagged issue.

The issue determination module 130 is configured to determine the root cause of the issue given the determinations to the responses of the detection module 120. The issue determination module is further configured to determine a probability associated with the root cause. In some cases, if the probability is below a threshold, the detection module may be configured to determine further questions, statistics, and/or results associated with the issue to raise the probability that the root cause is correct or that another root cause should be considered.

The traffic action module 140 is configured to provide for a corrective action passed on the root cause of the issue. In some cases, the corrective action may be a traffic management action such as congestion management, failover actions, or the like. In other cases, the traffic action module 140 may notify an operator or a particular person or team at the operator with the root cause of the issue. In still another case, the corrective action may be to make contact with a subscriber to provide the subscriber with information with respect to why he or she is receiving low QoE. It is intended that any notification to the operator or operator's team will include a severity level of the issue or users/subscribers affected by the issue. In some cases, the traffic action may be to upsell a customer or subscriber's network package, inform the customer or subscriber of a needed change in the Wi-Fi router location, further investigate a latency affecting a particular geographical location, resetting a particular node in the network, rerouting a traffic path with a BGP router issue, congestion management actions for a location, or the like. The traffic action module 140 may further provide for a visual representation of the root cause and associated data as detailed herein.

The monitoring module 150 is configured to monitor the issue after a traffic action has been completed to determine if the traffic action is having a positive effect on the QoE. In some cases, if a false positive or false negative has been determined as the root cause, the monitoring module 150 may determine that no improvement has been noted and that a further root cause determination should be accomplished. It is intended that with continuous feedback loops, the system and method will become more accurate and more efficient at determining the root cause of any issue.

Figure 3:
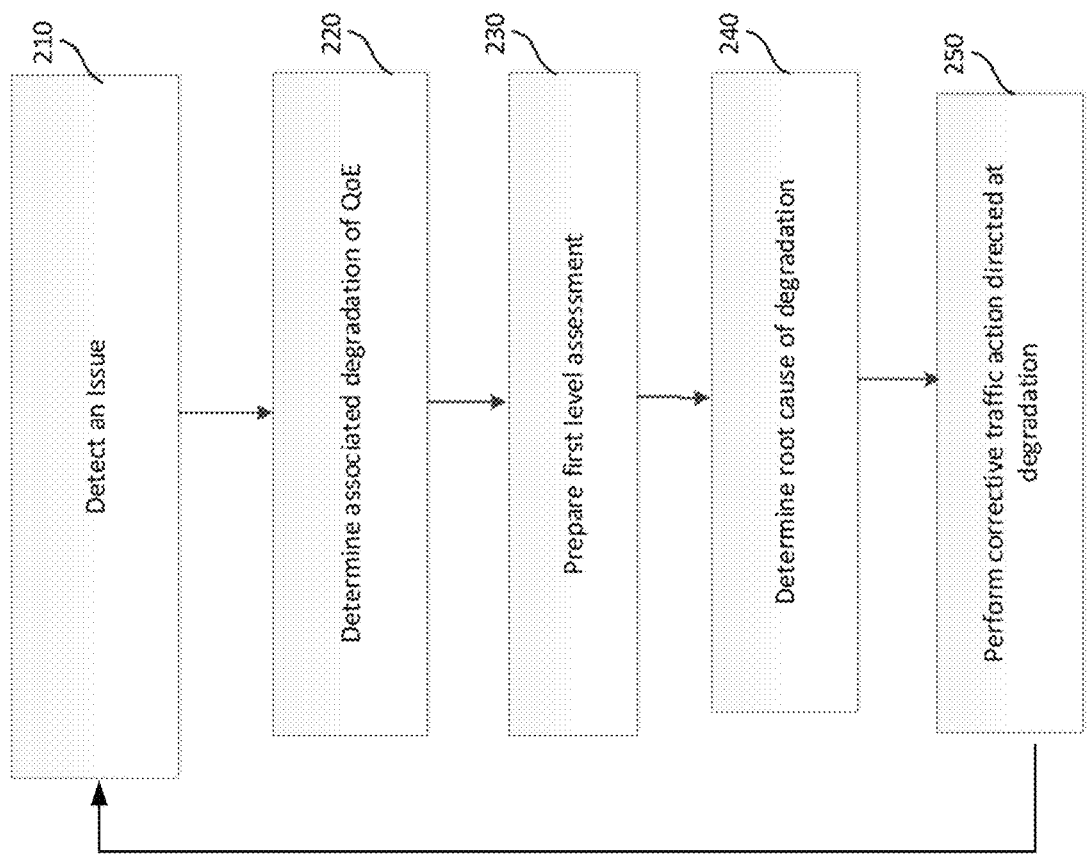
FIG. 3 is a flow chart of a method for root cause analysis according to an embodiment.

FIG. 3 illustrates an overview of the method 200 for root cause analysis. At 210, an issue is detected by a degradation in QoE or application QoE such that the QoE is below a predetermined threshold. For example, the QoE module 110 is configured to determine an AQoE score for each of a plurality of applications by users of the network and determine if a score needs to be flagged for further investigation. At 220, the QoE module 110 is configured to determine that there is an issue based on a degradation in the QoE or AQoE of at least one application for at least one user.

At 230, the detection module 120 is configured to perform a first level assessment to determine data associated with the QoE degradation. From the analysis of this assessment, the issue determination module is configured to determine the root cause of the degradation, at 240. In some cases, further levels of assessment or detection will be done to provide a sequence decision to determine the root cause. In some cases, the degradation of the QoE may be expected and easily determined and no further levels of assessment may be required. At 250, the traffic action module 140 is configured to perform corrective action directed at the degradation. In some cases, the traffic action module may provide for a visual representation of the root cause and affected subscribers and/or traffic. The monitoring module 150 is configured to monitor changes after the traffic action to determine if the traffic action has improved the issue or if the root cause has been improperly identified.

The outcome of answering Why is the probability of the root cause of the issue that can then be used to provide appropriate remedial recommended actions. In addition, this methodology of using 5 W framework is intended to permit incipient fault detection (detection of failures earlier on before they affect a large number of subscribers) leading to preemptive action.

Figure 4:
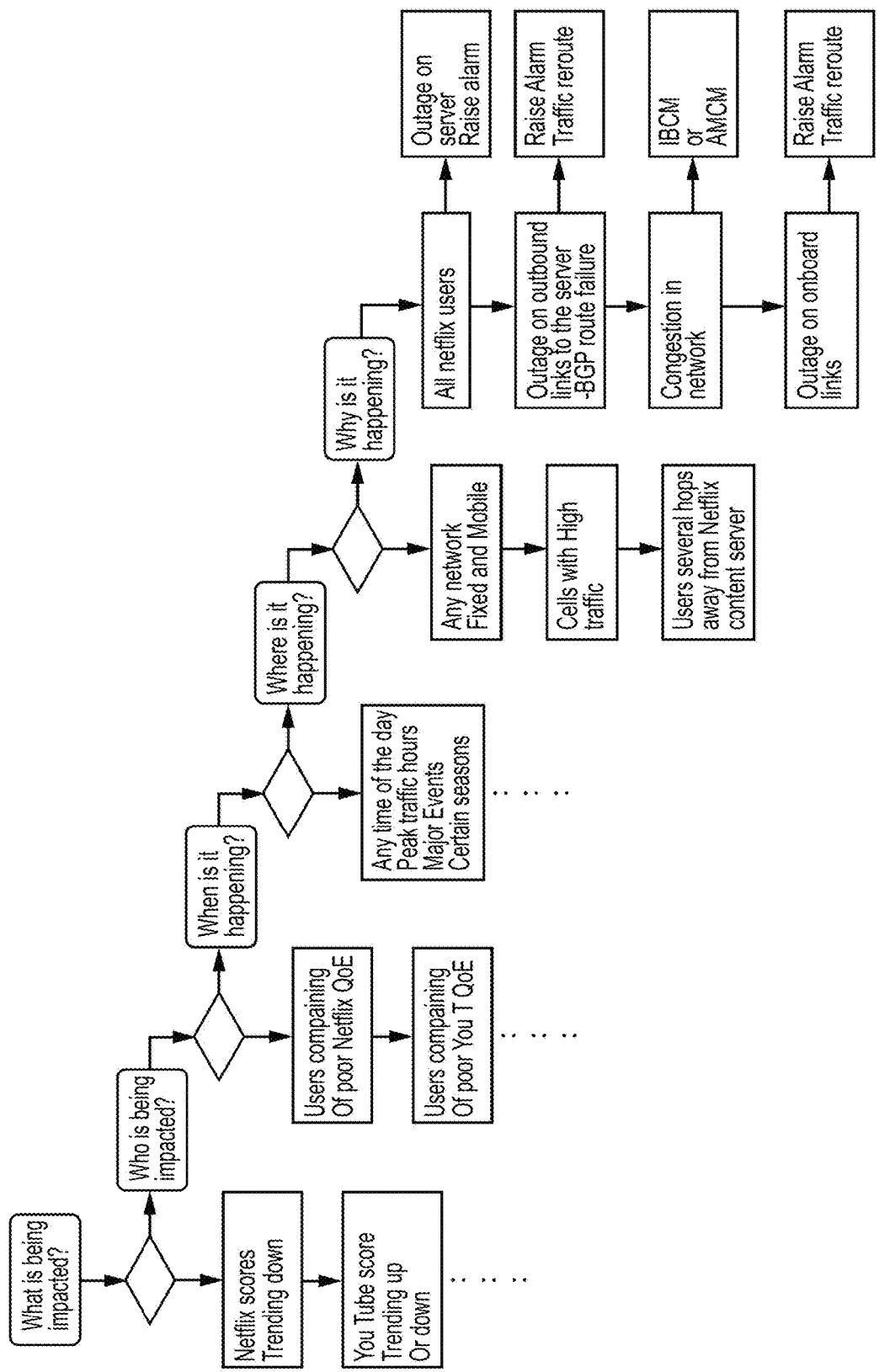
FIG. 4 illustrates a decision tree for determining root cause of an issue affecting a user on the computer network.

FIG. 4 illustrates an example of a process of questions that may be reviewed by the question module. The question module is intended to work through each question to provide for a root cause once a degradation is happening.

The question module may determine "What is being impacted?" as a first question. In particular, if Netflix AQoE scores are trending down, the question module will determine if other applications, for example YouTube or the like are also trending down. Further details as to what is being impacted may also be determined by determining the results of further questions such as:
  i. What is the % of users with poor Netflix QoE: as a % of total number of users, as a % of volume of total traffic?
  ii. What is the active duration of the Netflix flows, for these users? Is it minutes or hours?
  iii. Does the AQoE ever trend up? Does the AQoE ever improve?
  iv. What is the range of the AQoE score? What is the max (or 95%) score?

It will be understood that other questions may be asked depending on the responses for the initial questions and the application experiencing a QoE degradation.

The question module may further determine "Who is being impacted?". The question module may determine, for this example, the users complaining of poor Netflix QoE. In particular, the question module may determine, for example: For how many users are the scores trending downwards? Do these users with poor Netflix QoE also use other applications simultaneously when their Scores are trending lower? and/or Are other users with Application QoE scores (for example, YouTube™) that are also trending downwards? Other questions that may provide further information as to who is being impacted may be included.

The question module is further configured to determine temporal data or "When is it happening?". In this case, the system may determine aspects such as: Is poor QoE only during peak traffic hours? Any time of the day? Every day or only when there are major Events, or Seasonal events? The system may further determine aspects such as time of the day (Is QoE lower during congestion only? Or is it lower even during Off peak hours? Does the poor QoE improve upwards ever?) and/or duration (How long are the scores trending downwards? Is it periodic, for example, start of every hour?). The question module may further determine whether the degradation is a downward trend, or whether the degradation is still at an acceptable level of AQoE.

The question module is configured to determine location data or "Where is it happening?". Example questions may include: Are the users with poor Netflix QoE primarily mobile, or fixed, Are the users with poor Netflix QoE mapped to a common domain/location, for example the same cell, BGP route, or the like? Does a single user with poor Netflix QoE experience poor QoE only at a single location or at a plurality of different locations? How many hops away is the user from Netflix content server? Which of these users with poor Application QoE are mapped to cells with high traffic volume or congested cells? It will be understood that these questions are intended to be examples and other questions may be more suitable or provide further information in the response.

Once the questions are determined the issue determination module may use the response data from the question module to build a decision tree and assign probability of each of these events in the decision based on defining probability of outcomes. Accordingly, a set of recommendations may be made based on the probability of a particular outcome. Additional recommendation actions could also be supported within this framework. In the example provided in FIG. 4, possible reasons for the degradation of the AQoE may be that all Netflix users have poor QoE irrespective of the location than it may be a Netflix server outage and the traffic action module may raise alarms and notify the appropriate operations persona.

If it is not all users, the users that are experiencing issues may be mapped and it may be determined that the issue is on an outbound link to the server due to a BGP route failure or on inbound links for a group of subscribers or users. The traffic action module may again raise alarms and notify appropriate operations persona.

Another option may be that Netflix AQoE is poor only during peak hours, or at certain times of the day. At this point, the issue determination module may determine that the probable cause is congestion. The traffic action module may provide for further traffic management, for example TCP acceleration or other congestion management techniques.

In some embodiments of the system and method, a feedback loop may be created where users and or operators may provide feedback, for example a thumbs up or down, a confidence score, or the like for an action. This feedback may be included as input to the question module and issue determination module to improve the accuracy of the questions and the resolution. In addition, global feedback data can be collected to retrain the modules to improve accuracy.

In some embodiments, the system and method are intended to raise an alert or an alarm for the network operator. The alert or alarm is intended to provide details regarding an issue as well as provide details regarding the issue, for example, subscribers affected, possible fixes, or the like. It is intended that if issues are addressed proactively, subscribers will experience higher QoE or a return of higher levels of QoE faster.

Some examples of poor QoE are as follows, if a customer is on a plan that gives them 50 Mbps but the customer needs 70 Mbps to achieve a good experience on all their applications, their poor experience is due to needing to upgrade their plan (this is an intentional poor QoE situation, design intent). If the customer is on a plan that should give them 50 Mbps but they are only getting 1 Mbps due to issues in the network (this is an unintended poor QoE situation due to a system anomaly).

FIG. 5 is a table illustrating a top leave assessment and the sublevel detections that may be reviewed and analyzed by the detection module 120. In some cases, a top level assessment may include a determination of good QoE, an outage, poor QoE of a subscribe according to design, or poor QoE due to a network anomaly or the like. In some cases, the issue determination module 130 may determine there is an outage. Further levels of diagnosis may determine where the outage is, which paths and subscribers are impacted. The system may notify an appropriate team that is able to address the outage and or initiate an automatic traffic action to correct the issue. Generally, the system for root cause analysis is configured to detect top level assessments for external issues, such as issues originating outside of an operators' network that are negatively impacting the subscribers' experience, such as application server failures and device software glitches. Further, top level assessment may detect subscriber experience degradation, such as, uncover network issues that are damaging the operators' subscribers' experience, including understanding the number of affected subscribers and extent of the performance degradation. Other top level assessments may be network issues or network outages, such as detecting internal network failures and outages that impact the subscribers, including silent failures, plus know how many subscribers are impacted.

In other cases, the system may determine as a first level assessment that although the QoE for a particular subscriber is below a predetermined threshold, this is expected behavior. In cases where a subscriber is trying to receive greater bandwidth than their plan allows, the subscriber may be shaped or otherwise affected by policies in place by an operator. In some cases, further detection levels may be used to determine whether their traffic is shaped (or managed) or unmanaged. Further, the traffic action module may determine that the subscriber should be notified of the issues and provide a potential upsell of the subscriber's plan.

In a case where the top level assessment determines that there is poor QoE as well as a missed subscriber target, further corrective action may be done by the traffic action module or be initiated by the traffic action module and implemented by another network device. The further levels of detection are intended to determine if the issue is related to path congestion, network fault, application issue, device issue, Wi-Fi issue or other. Once a first level of detection is completed by the issue determination module, further data may be collected or reviewed to determine a second level of detection. As each level of detection is completed, the system may determine whether further data should be analyzed or if the system can determine a root cause and associated traffic action to address the issue.

Figure 6:
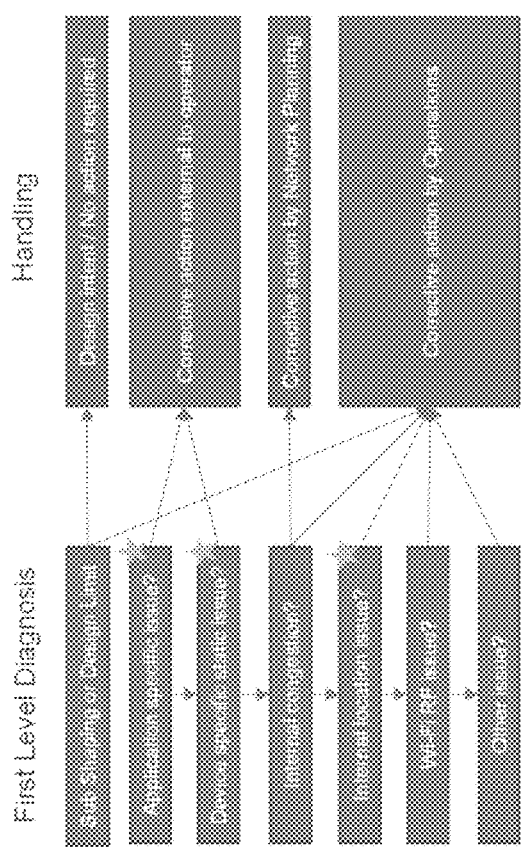
FIG. 6 illustrates a flow chart of top level assessments according to an example embodiment of the system and method.

FIG. 6 illustrates a flow between a first level diagnoses and the handling of the issue by the system. The system is configured to review specific traffic signatures and determine a top level assessment. There are scenarios that are intended to be reviewed sequentially as it may be more important to diagnose an application or device specific issue over, for example, Wi-Fi or internal congestion. Once a first level of diagnosis is completed, the system may determine whether a corrective action is an appropriate course of action or if the issue is intended as part of a policy or operator's design.

Figure 7:
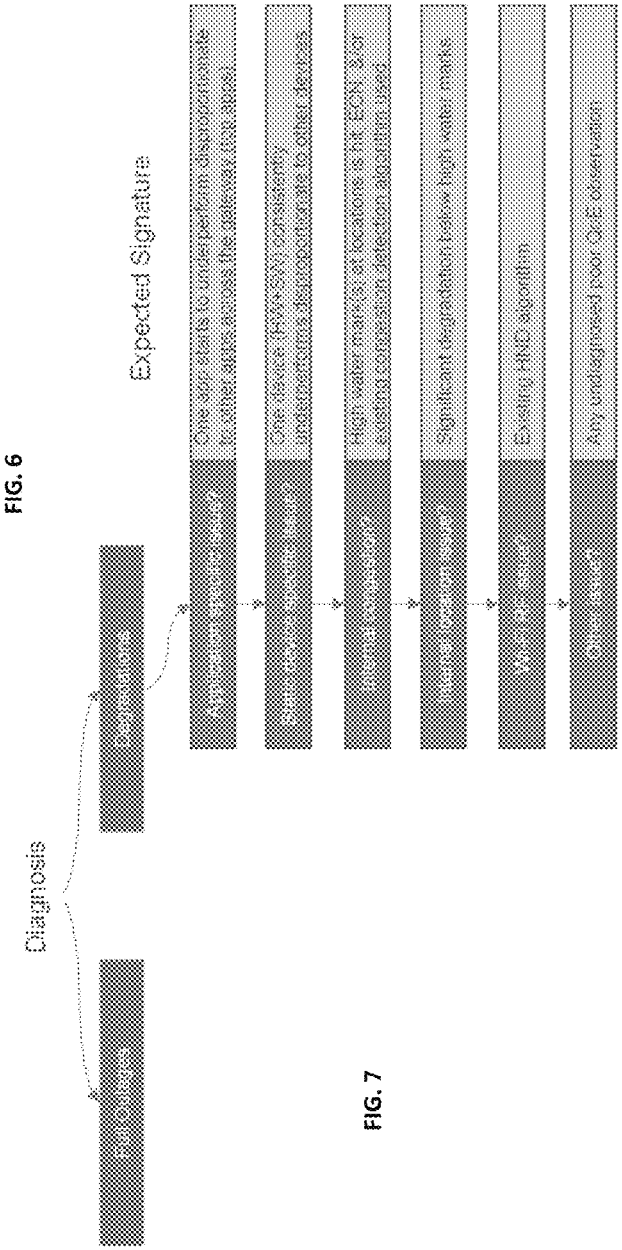
FIG. 7 illustrates a flow chart of further assessments for a QoE degradation according to an example embodiment of the system and method.

FIG. 7 illustrates further levels of detection that may be applied in a degradation of a QoE issue. In a scenario where a full outage is seen, the system may determine that further levels of detection are not necessary. If it is found that it is not a full network outage, further data is examined in a degradation of QoE. In particular, various traffic signatures are reviewed to determine the next level analysis. As an example, if it is an application specific issue, the traffic signature may show one application underperforming disproportionate to other applications. Traffic signatures may also be used to determine, for example, device specific issues, internal congestion, internal location issues, WI-FI RF issues or the like.

Figure 8:
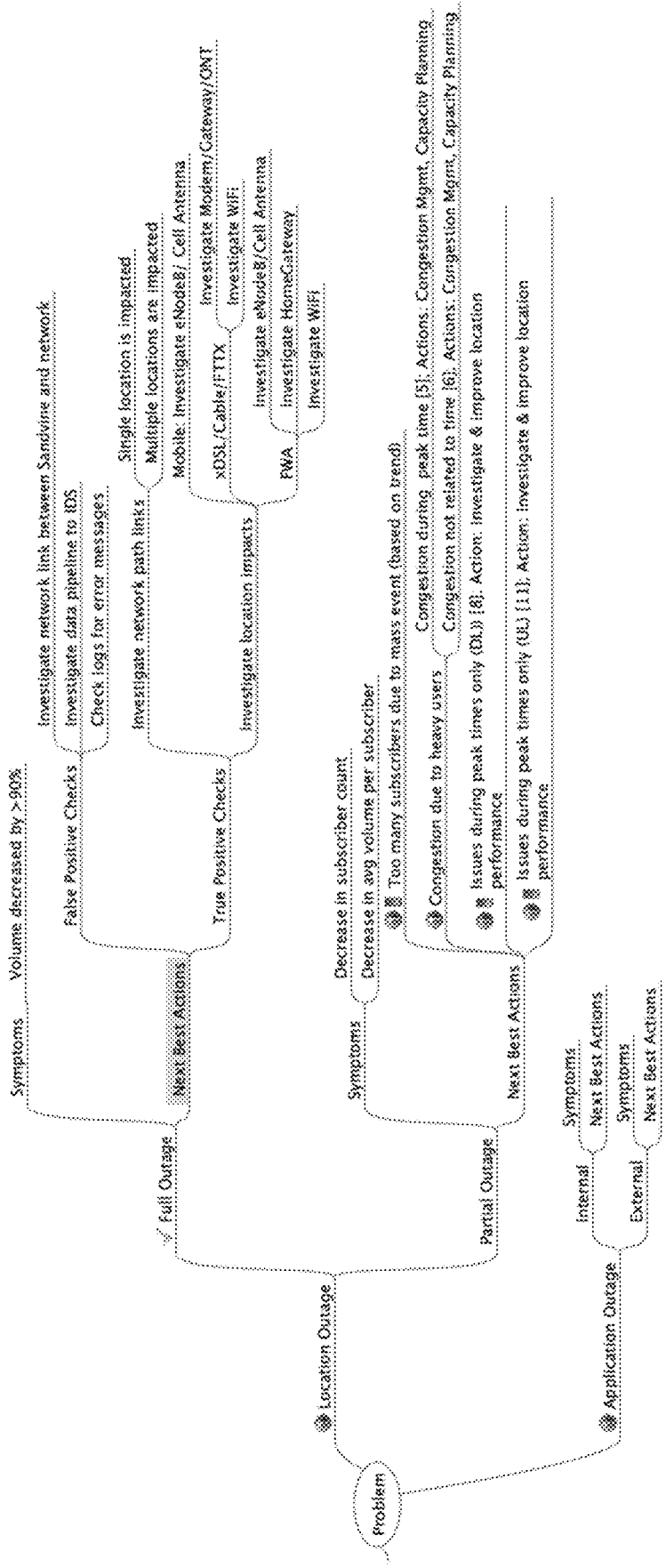
FIG. 8 is a decision tree of an outage scenario according to an example embodiment.

FIG. 8 illustrates a decision tree according to an example of an outage issue determined by the system. The decision tree may be used after the QoE module has determined that there is a QoE issue that requires further investigation. At a top level assessment, the detection module may determine whether the degradation in QoE is a location outage or an application outage. This detection can be triggered via multiple mechanisms including, for example, statistical approaches, artificial intelligence, machine learning or the like.

If the outage relates to a specific application, the issue determination module may determine which application, whether the issue is internal or external. From this determination of the root cause, the traffic action module may provide for a next best traffic action to best address the issue.

If the outage is location based, the issue determination module may review the collected data from the QoE module and the traffic patterns this data provides to determine if the outage is a full outage or a partial outage. If a partial outage is detecting, the traffic action module may determine various traffic actions that are intended to improve the situation. The monitoring module may then monitor the traffic to determine if the traffic actions have improved the QoE of the subscribers.

If a full outage is determined, the system will note that the traffic has decreased by a significant percentage. The traffic action module may determine actions or provide alerts with respect to the outage. The monitoring module may then perform false positive and true positive checks to determine further detail with the outage and whether the determination of the outage was inappropriate. The monitoring module may investigate various links and pipelines and check logs for error messages. It is intended that the number of false positives determined by the system will be reduced over time with the monitoring provided by the monitoring module.

Figure 9:
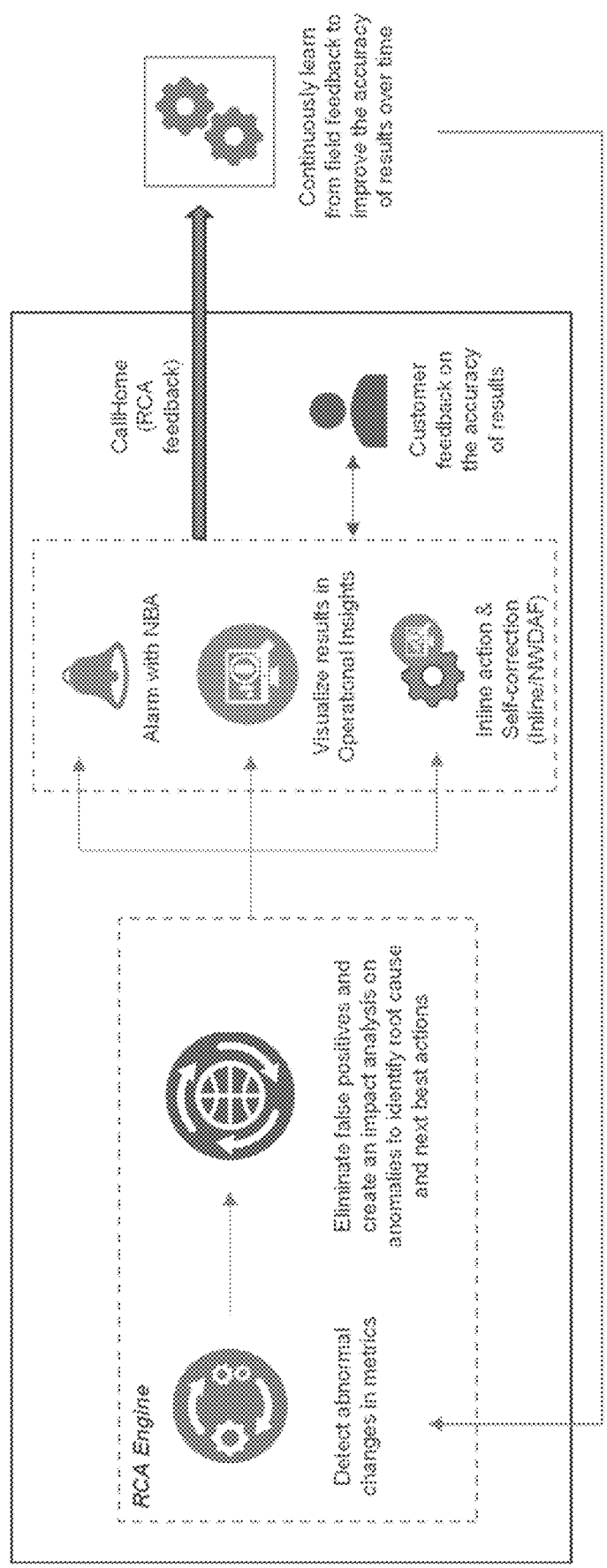
FIG. 9 illustrates a feedback loop according to an example embodiment.

FIG. 9 illustrates a feedback loop as an embodiment of the system. The system for root cause analysis detects abnormal changes or degradations to QoE or application QoE. The feedback loop shown in FIG. 9 is intended to improve the overall accuracy in the determination of the root cause. In particular, the system is intended to eliminate false positives by reviewing the traffic patterns after a traffic action has been applied to ensure that the correct issue was addressed. The system, once an issue has been detected, may raise an alarm, provide a visualization of the action with operational insights into the issue, perform inline action or self-correction, or the like, to improve the issue determined by the root cause analysis system. The root cause analysis monitoring module may review traffic patterns after these traffic actions have been performed or may further receive customer feedback regarding the accuracy of the results and actions addressing the root cause.

Figure 10:
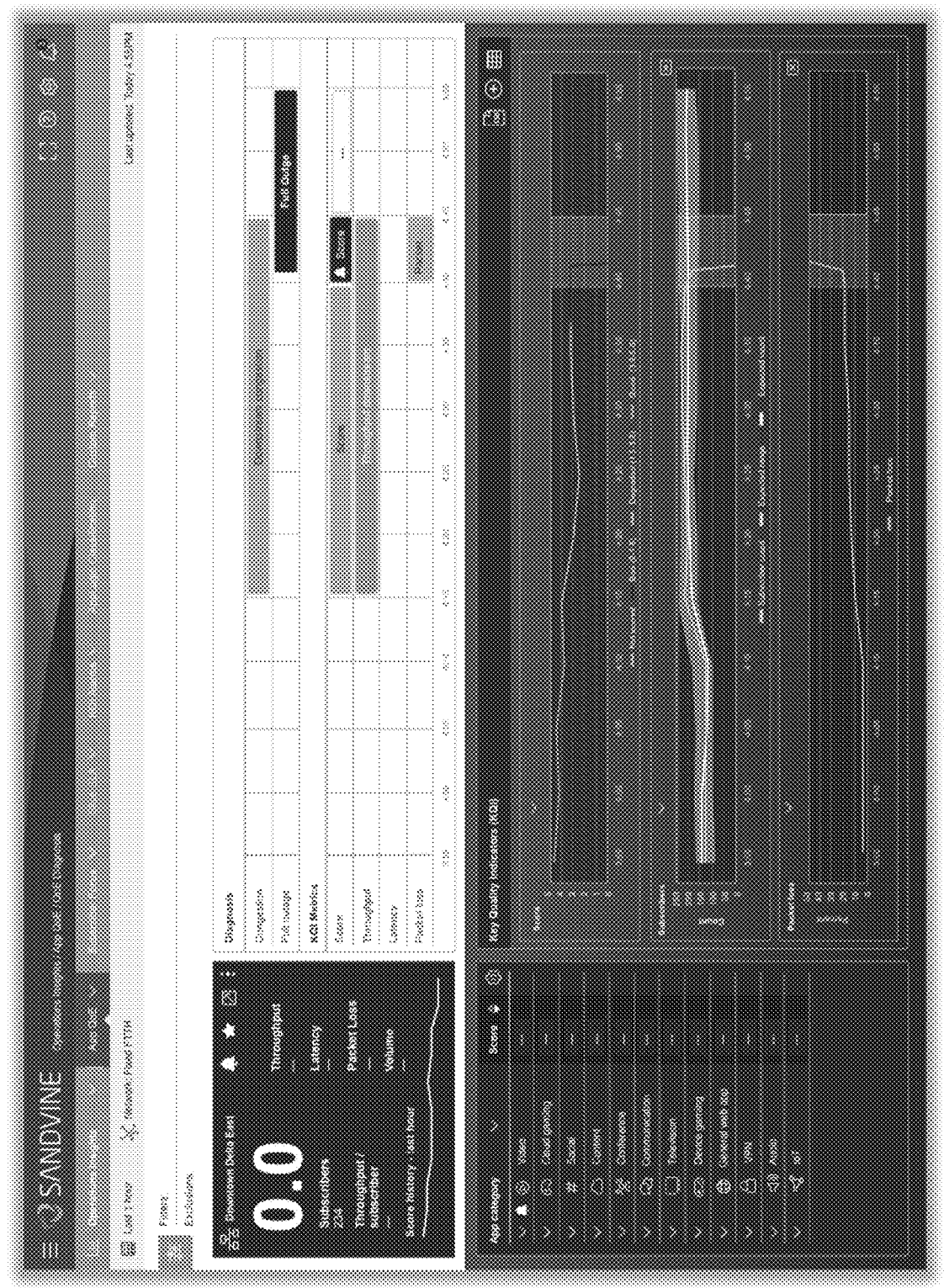
FIG. 10 is an example notification screen according to an example embodiment of the system.

FIG. 10 illustrates a visual representation of an alert that may be provided by the system. As can be seen from the graphical user interface associated with the system and method, an alarm can be raised when a degradation of QoE occurs with subsequent alarms and notifications when further issues occur. From the visualization in FIG. 10, there is a yellow warning line when there is congestion noted in the network that has resulted in a degradation of the subscriber QoE. The congestions traffic patterns are noted below as subscribers and packet loss increases and the overall QoE scores decrease.

From FIG. 10, the operator may be given information with respect to an outage. In this scenario, the QoE score may drop to zero and other trend lines may also drop as the outage affects the traffic flows while packet loss may increase accordingly. If the operator clicks on or otherwise drills down on the outage, further diagnosis details may be provided, for example, location data, number of subscriber data, volume of data, timing data and the like. The system for root cause analysis is further intended to continue the monitoring and to apply traffic actions to address the outage and other degradations of QoE. In some cases, the visualization may provide recommendations as to the next best traffic action after a root cause analysis diagnostic.

The visualization is intended to provide the user with a summary tile which provides performance metrics over the last time interval, for example the last 2 minutes, last 5 minutes, or the like, based on at least one filter criteria. The visualization further provides for the root cause diagnoses on a timeline as well as providing some primary KQIs. It is intended that the KQIs may be selectable and be further reviewed by the operator. Further, the visualization is configured to provide update on various QoE scores and may be drilled down by location, subscriber, application, or the like.

Figure 11:
FIG. 11 is an example subscriber data screen according to an example embodiment of the system.

FIG. 11 is a visualization of a subscriber's network usage according to an example embodiment. The system is configured to diagnose subscriber specific QoE degradation and determine the root cause of this degradation. In the example shown in FIG. 11, the subscriber may have multiple issues affecting the subscriber's QoE, for example, the subscriber may be over his or her plan and may also have poor Wi-Fi router placement. In some cases, if a subscriber were to call or otherwise reach out to the operator, the system for root cause analysis is configured to diagnose the issue and the traffic action module may suggest solutions such as Wi-Fi repositioning, upgrading the plan or the like. In other cases, if the system for root cause analysis notes that a subscriber is suffering from an issue, the system may notify the subscriber letting them know the issue and a potential solution that may address the root cause.

When network operator's customers have issues, the data provided by the system for root cause analysis may be used by the operator's website, chatbot, and/or IVR systems to provide the answers to the customers need without the involvement of a customer care agent. The diagnostics of the system for root cause analysis is configured to provide the data necessary for a chatbot to answer specific concerns of a customer.

An AI-based diagnostics incorporate a mix of rule-based, statistical and machine learning mechanisms to capture digital fingerprints that are coupled with knowledge the system has used to diagnose the cause of an issue and prescribe next best traffic actions. With supervised machine learning, certain fingerprints can be trained via fault simulation and/or historic labeled field data. The system for root causes analysis is configured to capture user-plane data at aggregation points and contextualizes the traffic with individual subscriber, device, originating location and other information.

The system is configured to monitor contextualized traffic and KQIs to identify anomalies and capture fingerprints for diagnosing issues, including silent failures that are not alarmed by the network element at fault. For example, the fingerprint of a network outage exhibits a spike in packet loss and a sudden drop in traffic volume below predicted levels across all subtending subscribers. Contextualized user-plane traffic, historic trends and cross-network performance thus enable issues to be diagnosed and localized to the source by the system for root cause analysis.

Figure 12A:
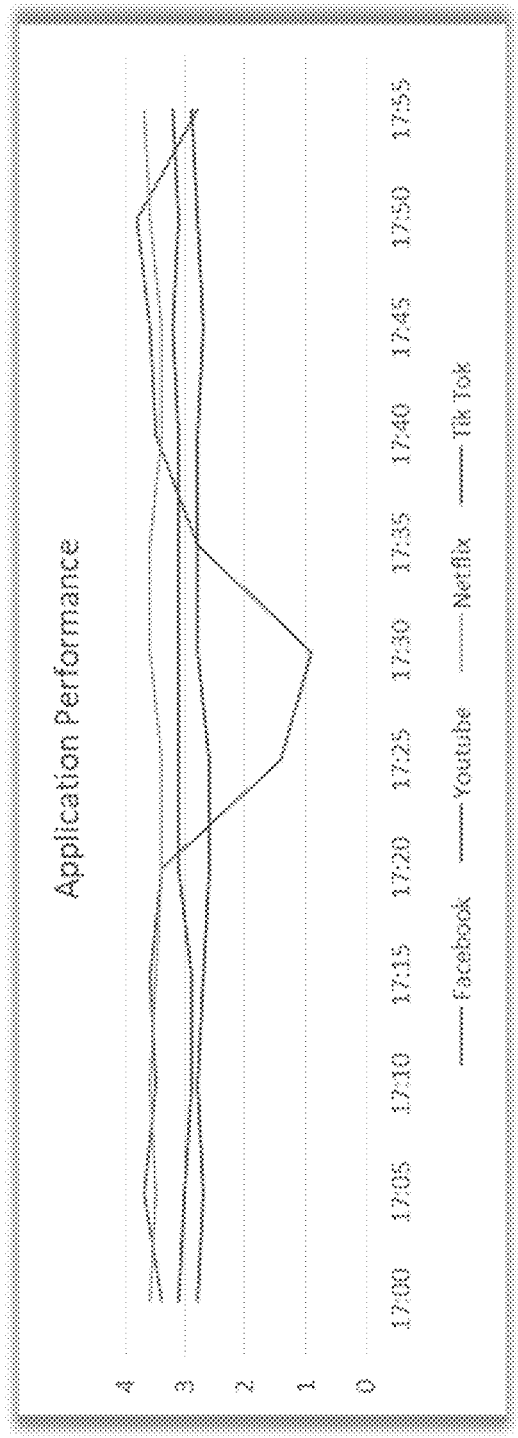
FIGS. 12A and 12B illustrate traffic signatures of a degradation of an application QoE according to an embodiment of the system.
Figure 12B:
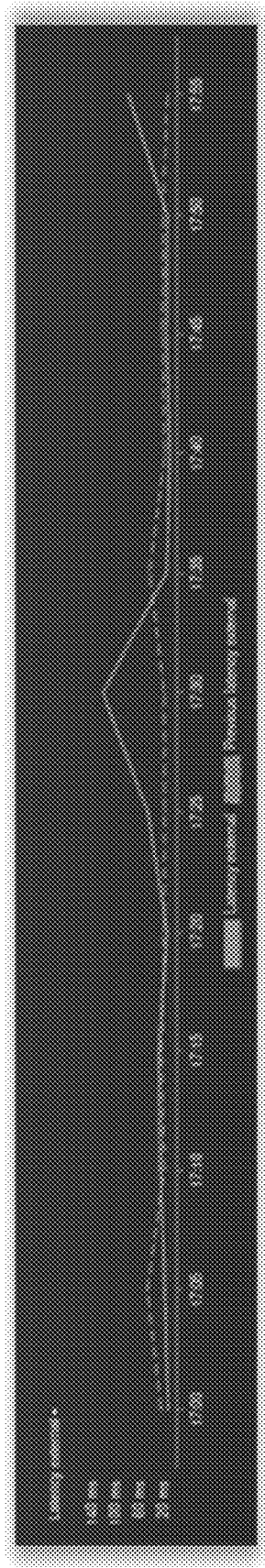

FIGS. 12A and 12B illustrate an example of traffic patterns where a particular application suffers an outage or issue. Monitoring application performance across all subscribers enables the system for root cause analysis to distinguish when a particular application is experiencing issues versus when an individual subscriber or broader network issue is occurring. Additional data points such as application server addresses, BGP route information, DNS responses and external specific KPIs (such as latency, packet loss and the like) provide an even clearer fingerprint and enable more granular diagnosis to be performed. The system for root cause analysis may be able to determine which application is suffering the issue and the timing of the issue and the like.

In some embodiments, the system may be used for Application QoE determination and may be a subsystem or a reconfigured system of the system for root cause analysis. Embodiment of the method are further configured to determine the Application QoE and provide for traffic actions based on the reason for the degradation of the AQoE.

Embodiments of the system and method are intended to monitor AQoE through an Application Score, which may be determined based on a single application or group of similar or related applications. For example, a system is configured to monitor a Netflix™ score for a user, a Gaming score for a user, a Web score for a user and the like. The score may have a range from 1-5, 1-10, 1-100, although other scales may be used. AQoE may be monitored, for example, every 10 seconds, thirty seconds, 1 minute, 2 minutes, every 5 minutes, every 10 minutes, or the like, giving a window into the health of the network.

Degradation in AQoE for a given application is generally an indicator of network congestion or network impairment, such as a link failure, server or cache failure, unexpected traffic events, or even a malicious subscriber or network security attack. Network congestion happens when the traffic demand on the network is higher than the network resources can handle. Traffic demand rises when a greater number of users are active on the network, consuming a mix of higher bandwidth applications, low latency, low packet loss applications. These applications can be a mix of near-real time (such as gaming) and non-real time applications.

Congestion management can be implemented by setting an Application Intent for various application categories and continuously operating a closed loop that will allocate bandwidth dynamically across various service categories to achieve those respective Intents. The intents may be set differently for Fixed networks such as (DSL, GPON, FWA, and the like) and Mobile networks.

Invoking congestion management in the network through automated closed loop actions, and recommendation of the appropriate set of targeted and timely actions is helpful for network operators, such as an Operations persona. Presentation of a clear set of actions driven by AQoE data can lead to responses that restore the network to deliver end user QoE at a level the user will appreciate. Embodiments of the system and method detailed herein are intended to accomplish this without the Operations persona having to mine through data themselves. Further, the system and method are intended to take actions in real time to address and/or correct congestion management.

Figure 13:
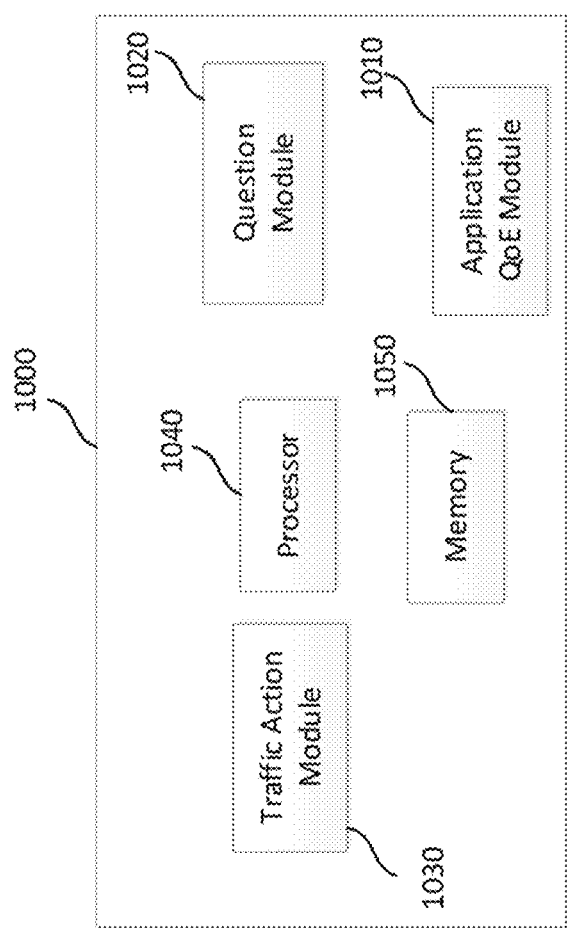
FIG. 13 illustrates a system for determining application Quality of Experience according to an embodiment.

FIG. 13 illustrates a system 1000 for application QoE. The system is intended to include an application QoE module 1010, a question module 1020, a traffic action module 1030, at least one processor 1040 and at least one memory component 1050. The system is generally intended to be distributed and reside in the data plane. A central processing unit or the control processor may be configured to execute the instructions stored in the memory component in order for the modules to execute their functions.

The application QoE module 1010 is configured to monitor the application QoE of the subscribers and/or users using the operator's network. The application QoE module 1010 is configured to determine a score for the QoE for the applications. To determine the QoE, the application QoE module determines the application and various traffic parameters, for example, application category (category may be, for example, streaming, conversational, browsing, gaming etc.), latency, packet loss, pattern of transfer, throughput, and the like. The parameters may be determined on the flow periodically, where the periodicity varies depending on the application and/or the method used. The application QoE module is configured to determine if there is an anomaly in the application QoE of a user or if there is a decrease or downward trend in the AQoE score that may indicate an issue with the user's experience of the network. In some cases, the system may analyze any AQoE score below a predetermined threshold. In other cases, the monitoring may be continuous or may be at predetermined intervals, for example, every 2 minutes, every 5 minutes, every 10 minutes, or the like. Any analysis may occur after a downward trend is seen, or if a plurality of consecutive measurements is below a predetermined threshold.

The question module 1020 is configured to determine associated questions and responses once the application QoE module 1010 has flagged or noted an issue with a subscriber's application QoE. The question module 1020 may use a decision tree to determine the 5 Ws associated with the issue and may review various applications to determine what is being affected, who is being affected, when is the effect being noticed and where is it being noticed. From the review of these types of questions, as detailed herein the question module 1020 is configured to determine various aspects about the flagged application QoE.

The traffic action module 1030 is configured to provide for a corrective action based on the congestion levels of the network and the determined aspects associated with the application QoE. In some cases, the corrective action may be a traffic management action such as congestion management, TCP-acceleration, or the like. In other cases, the traffic action module 1030 may notify an operator or a particular person or team at the operator with respect to the congestion issue and the need for further resources to address the congestion of the network. In some cases, the system may include a monitoring module similar to the monitoring module 150 to review the results of the corrective traffic actions after the actions have been applied to the network.

Figure 14:
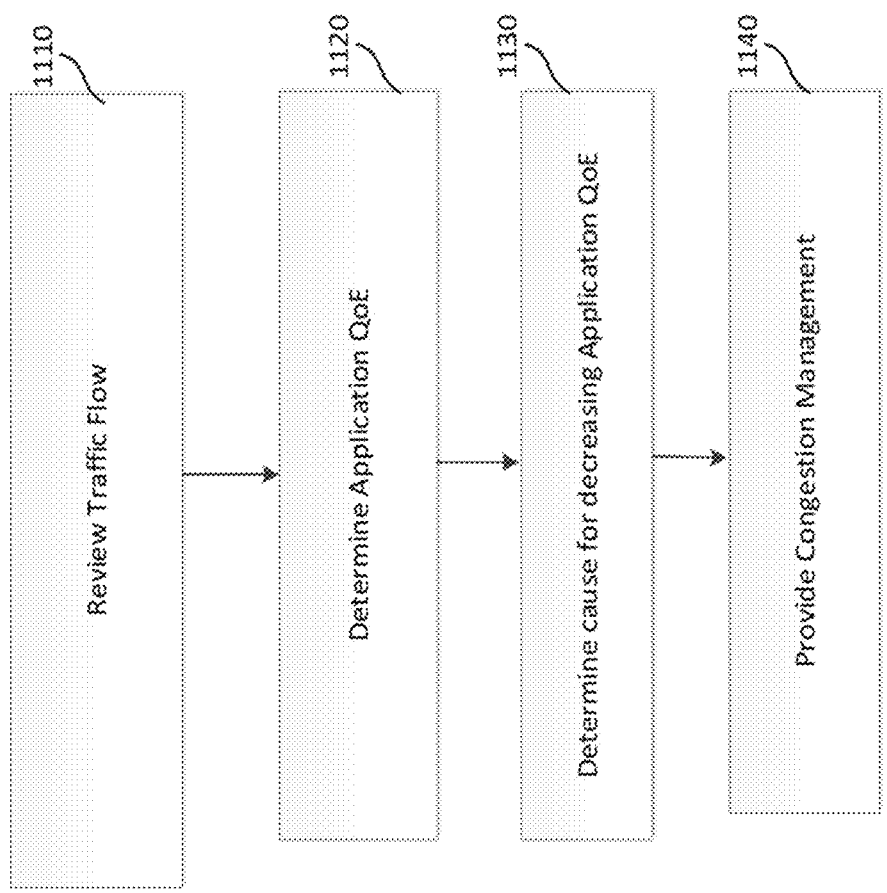
FIG. 14 is a flow chart of a method for determining application Quality of Experience according to an embodiment.

FIG. 14 illustrates an overview of the method 1100 for determining application QoE. At 1110, the application QoE module 1010 is configured to determine an AQoE score for each of a plurality of applications by users of the network. At 1120, the application QoE module 1010 is configured to determine a decrease or downward trend in AQoE of at least one application for at least one user.

At 1130, the question module 1020 is configured to determine questions and data and, in particular, the 5 Ws associated with the decrease and the data associated with these decreases. From the analysis of these questions, the system is configured to determine a cause for the decreasing application QoE. At 1140, the traffic action module is configured to perform corrective action directed at the decreasing application QoE, by for example providing congestion management.

Monitoring user AQoE across applications and operating Intent Based congestion management through the framework of 5 W's (What, Who, When, Where, Why) is intended to permit for effective CAPEX deferral.

Embodiments of the system and method detailed herein are intended to monitor the 5 Ws, namely: What is being impacted? Who is being impacted? When is it happening? Where in the network is it happening? and Why is it happening?

Congestion management in the network is intended to be improved by monitoring the AQoE for each user across various applications. As traffic grows and ebbs in the network the AQoE will change and thus the network benefits from AQoE being monitored in near real time. Various statistics (mean, median, min and max, for one or more subscribers) could be aggregated per subscriber, per location, or the like, depending on the first questions.

A specific example would be if a significant percentage of subscribers in a particular location are sometimes but not always experiencing poor AQoE. In such a scenario, then likely there is congestion in network and congestion management needs to be done. If there is poor AQoE throughout, then there could be a cell capacity planning issue, an issue in the location, or the like. If a percentage of subscribers always experience poor AQoE, they may be in poor signal condition which could be due to poor cell dimensioning during planning due to subscriber facing obstructions, or the like.

Responsive and effective traffic actions benefit from knowing when the AQoE is meeting an Intent objective and if not, how far away is the AQoE from the Intent. As such, the system is configured to continuously monitor AQoE. The intent objective is usually configured in the system and may therefore be provided by the operator. In a specific example where there is an AQoE range from 1 to 5, the operator may choose an intent objective of 3 for streaming and 4 for voice. Therefore, when AQoE for streaming drops below 3, corrective action like congestion management may be applied. By asking a series of Why questions, the framework can know when to start congestion management, how much bandwidth to balance across application categories, when to stop when there is no perceptible change in AQoE and the like.

Identifying the effectiveness of congestion management requires examination of available AQoE data from the perspectives of number of users, duration of congestion management and declaration of when an Intent is or is not being met. With the help of various questions, certain hypotheses can be excluded, while other hypotheses can be corroborated with each other. A decision tree can be constructed with probability of likelihood for various events to help determine the cause of the degradation of the AQoE, namely why an event (namely a congestion event) is resulting in the outcomes on AQoE being observed.

The question module considers each of the W questions in assessing the probability of a given outcome. For example, if the degradation in AQoE (for example, a Gaming application) is low consistently and the intent is therefore not met, it may be possible to reallocate bandwidth from other categories to give to the gaming category to raise the AQoE for gaming. This reallocation is intended to be done dynamically as needed to meet AQoE intents.

The outcome of answering Why is the probability of effectiveness of congestion management to achieve the Intent across various application categories. Further, the system and method may provide appropriate remedial recommended actions, for example, upgrading a cell site with additional spectrum, examining users who are in the lower quartile of the scores that may be tier plan limited or maybe in poor coverage, or the like. In addition, this system and method using framework are intended to provide recommendations with respect to upgrading a backhaul link that may be serving a plurality of congested cell sites.

Figure 15:
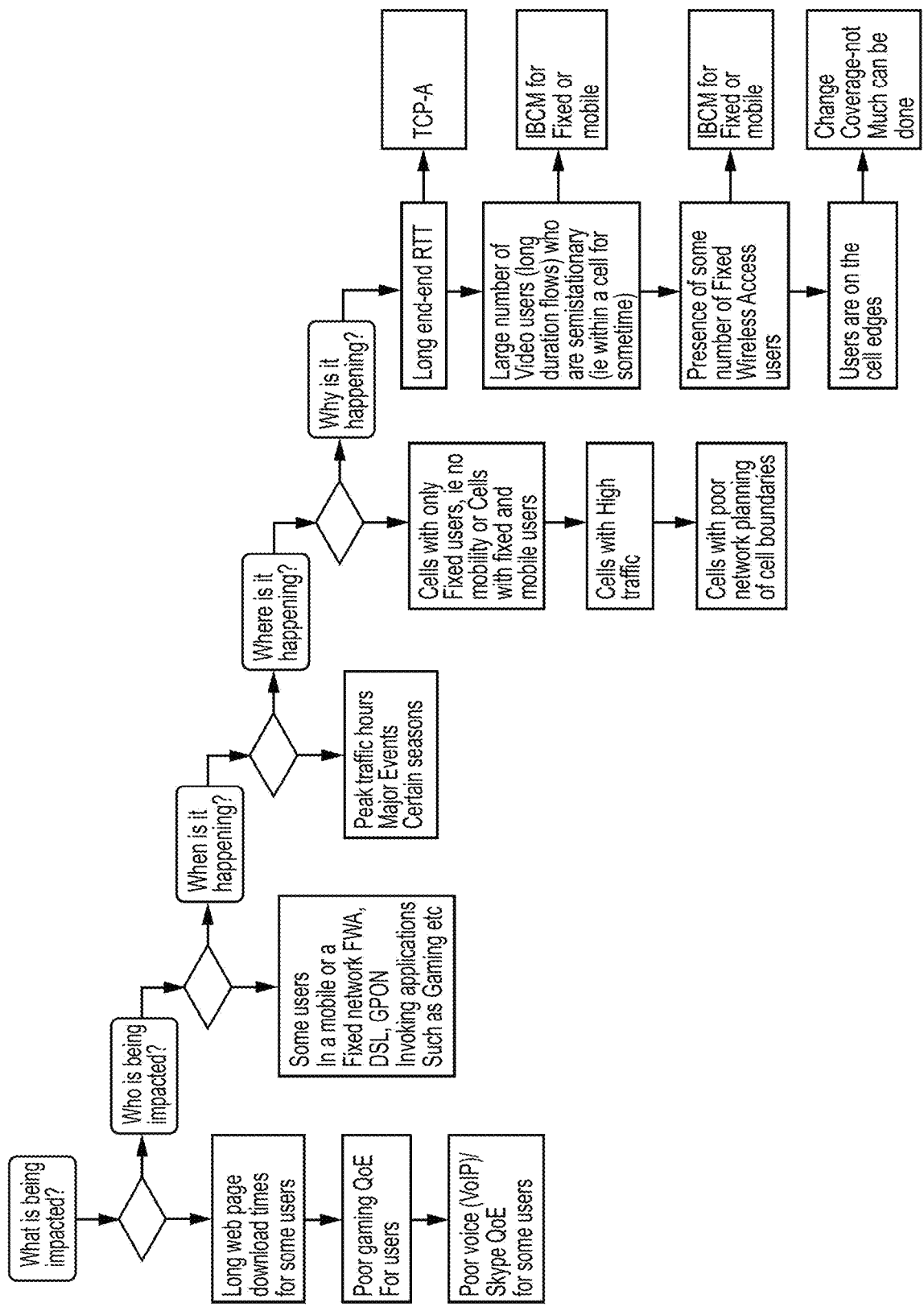
FIG. 15 illustrates a decision tree for determining application Quality of Experience for a user on the computer network.

FIG. 15 illustrates an example method of a decreasing application QoE being reviewed by the question module 1010. The question module may have noted that the gaming AQoE is below a predetermined intent. The question module 1010 is configured to determine What is being impacted? The question module may determine that simultaneously another Application, for example, YouTube™, or the like also has scores that are also below the predetermined Intent. On the other hand, content download scores may be consistently high above Operator specified Intent.

During the determination of what is being impacted, the question module may further determine aspects such as:
  i. What is the % of users with poor Gaming QoE: as a % of Total number of users, as a % of volume of total traffic and the like?
  ii. Does the AQoE ever trend up for a given application category?
  iii. Does the AQoE ever improve?
  iv. What is the range of the AQoE score?
  v. What is the max (or 95%) and min score?

The question module may further determine "Who is being impacted?" The question module may determine whether there are other users complaining of poor Gaming QoE or users getting high Video QoE much above their needed or desired Intent. The system may further determine, for example, how many application categories are the aggregated user scores trending downwards, do these users with poor Gaming QoE also use other applications simultaneously when the Application QoE of those applications also trending lower, are there other users with Application QoE scores of other applications that are also trending downwards, and the like.

The question module is further configured to determine when the Application QoE is below a desired intent or when it is decreasing. In some cases, the question module may determine further information as to when the AQoE is below a threshold or is decreasing, for example:
  i. Is poor QoE only during peak traffic hours?
  ii. Is poor QoE at any time of the day?
  iii. Is poor QoE every day or only when there are major Events, or Seasonal events?
  iv. Is QoE lower during congestion only? Or is it lower even during Off peak hours?
  v. Does the poor QoE improve upwards ever?
  vi. How long are the scores trending downwards? Is it periodic, for example at the start of every hour?
  vii. Is the lowest AQoE simply trending downwards?
  viii. Are there any users that are outliers, whose score does not improve even with congestion management?

The question module 1010 is further configured to determine location information or "Where is it happening?". Location information can also include information with respect to the cells and/or network serving the users. For example, where questions may include:
  i. Are the users with poor Gaming QoE primarily mobile or fixed network users?
  ii. Are the users with poor Gaming QoE mapped to a common domain and/or location, for example, a specific cell, BGP route or the like?
  iii. Does a single user with poor Gaming QoE experience poor QoE only at a single location or at various locations?
  iv. Which of the users with poor Application QoE are mapped to cells with high traffic volume, or congested cells?

The question module defines a decision tree and is configured to assign probability of each of these events below based on defining probability of outcomes from the questions. Accordingly, a set of recommendations are able to be made such as detailed herein. Additional recommended traffic actions could also be supported and initiated by the traffic action module.

Embodiments of the system and method are intended to review the above questions and determine, for example, whether all Gaming users have very poor AQoE irrespective of the subscriber location or the system may map users to network topology to identify probable causes. In some cases, the cause may be congestion at a specific cell or link and the traffic action may be to improve gaming QoE with TCP acceleration with or without other congestion management techniques, such as, load balancing, blocking, traffic steering or the like.

In other cases, the system and method may determine the issue is due to the lack of capacity and may require capacity expansion to improve the AQOE. The traffic action module may note that capacity expansion may be required when congestion management does not achieve Intent over longer durations. The traffic action module may notify appropriate Operations persona of the recommended Capacity expansion.

In still other cases, the system and method may determine there is a need for Home Network Diagnostic or Tier Plan Optimization to improve the AQoE for a user. The traffic action module may raise alarms or otherwise notify Operations persona when congestion management improves an overall mean user AQoE but does not improve AQoE of a few users. In this case, the users may benefit from Home Network Diagnostics or Tier Plan Optimization.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium.

The instructions stored on the machine-readable medium can be executed by a processor or other suitable processing device and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for root cause analysis in a computer network, the method comprising:
   determining a degradation of Quality of Experience (QoE) for at least one traffic flow of at least one user on the computer network;
   determining a traffic pattern associated with the degradation of the QoE;
   determining a root cause for the degradation based on the traffic pattern, wherein determining the root cause comprises:
      determining a top level assessment of the degradation;
      determining whether the degradation was an intended response; and
      reviewing further diagnostic levels of the traffic pattern to determine the root cause; and
   implementing a traffic action response based on the root cause of the degradation.

2. The method of claim 1 further comprising:
   monitoring the at least one traffic flow to determine whether the QoE is improving; and
   if the QoE is not improving, implementing a next best traffic action to address the root cause.

3. The method of claim 2 further comprising:
   if the QoE is not improving determining whether the root cause was a false positive or false negative assessment;
   determining further data associated with the degradation of QoE to determine a new root cause; and
   implementing a further traffic action response to address the new root cause.

4. The method of claim 1 wherein the determining the degradation of QoE further comprises:
   determining whether the degradation of QoE is an intended response to the at least one user; and
   if the degradation is the intended response, then providing a traffic action response of suggesting an upgrade in network plan to the at least one user.

5. The method of claim 1 wherein determining the traffic pattern associated with the degradation of the QoE comprises:
   reviewing the traffic flow of the at least one user; and
   determining a sequence of events of the traffic flow to create the traffic pattern.

6. The method of claim 1 wherein implementing at least one traffic action comprises preparing a visual representation of the degradation of QoE and the at least one subscriber affected.

7. The method of claim 6 wherein the visual representation provides details as to the root cause of the degradation of QoE and potential further traffic actions to address the degradation.

8. The method of claim 1 wherein implementing at least one traffic action comprises implementing at least one congestion management traffic action.

9. A system for root cause analysis in a computer network, the system comprising:
   a QoE module configured to determine a degradation of Quality of Experience (QoE) for at least one traffic flow of at least one user on the computer network;
   a detection module configured to determine a traffic pattern associated with the degradation of the QoE;
   an issue determination module configured to determine a root cause for the degradation based on the traffic pattern, wherein determining the root cause comprises:
      determining a top level assessment of the degradation;
      determining whether the degradation was an intended response; and
      reviewing further diagnostic levels of the traffic pattern to determine the root cause; and
   a traffic action module configured to implement a traffic action response based on the root cause of the degradation.

10. The system of claim 9 further comprising:
    a monitoring module configured to monitor the at least one traffic flow to determine whether the QoE is improving; and
    if the QoE is not improving, the traffic action module is configured to implement a next best traffic action to address the root cause.

11. The system of claim 10 further comprising:
    if the QoE is not improving, the monitoring module is configured to determine whether the root cause was a false positive or false negative assessment;
    the detection module is further configured to determine further data associated with the degradation of QoE to determine a new root cause; and
    the traffic action module is further configured to implement a further traffic action response to address the new root cause.

12. The system of claim 9 wherein the detection module is further configured to determine whether the degradation of QoE is an intended response to the at least one user; and
    if the degradation is the intended response, then the traffic action module is configured to provide the traffic action response of suggesting an upgrade in network plan to the at least one user.

13. The system of claim 9 wherein the detection module is further configured to:
    review the traffic flow of the at least one user to determine the traffic pattern associated with the degradation of the QoE; and
    determine a sequence of events of the traffic flow to create the traffic pattern.

14. The system of claim 9 wherein the traffic action module is configured to provide a visual representation of the degradation of QoE and the at least one subscriber affected.

15. The system of claim 14 wherein the visual representation provides details as to the root cause of the degradation of QoE and potential further traffic actions to address the degradation.

16. The system of claim 9 wherein the traffic action module is configured to provide at least one traffic action comprises implementing at least one congestion management traffic action.

* * * * *